United States Patent [19]

George et al.

[11] Patent Number: 4,612,584
[45] Date of Patent: Sep. 16, 1986

[54] SCREEN GRAVURE ENGRAVING SYSTEM FOR ELECTROMECHANICAL ENGRAVERS

[75] Inventors: Harvey F. George, West Hempstead; Yair Toor, Forest Hills, both of N.Y.

[73] Assignee: Gravure Research Institute, Inc., Port Washington, N.Y.

[21] Appl. No.: 670,049

[22] Filed: Oct. 31, 1984

[51] Int. Cl.⁴ .................. H04N 1/40; H04N 1/21; H04N 1/23; H04N 1/024
[52] U.S. Cl. ............................ 358/299; 358/283; 358/284; 358/294
[58] Field of Search ............... 358/280, 283, 284, 293, 358/294, 299

[56] References Cited

U.S. PATENT DOCUMENTS

| 2,892,887 | 6/1959 | Hell | 358/283 |
| 4,288,821 | 9/1981 | Lavallee et al. | 358/283 X |
| 4,482,923 | 11/1984 | Fisher et al. | 358/283 |
| 4,484,232 | 11/1984 | Gast | 358/299 |
| 4,509,195 | 4/1985 | Nadler | 358/284 X |

Primary Examiner—E. A. Goldberg
Assistant Examiner—Patrick W. Foster
Attorney, Agent, or Firm—Parmelee, Bollinger & Bramblett

[57] ABSTRACT

A method and associated apparatus is provided for converting halftone and screened films (12A and 12B) for use with electromechanical gravure engravers (22), comprising the steps of positioning an array (26) of photosensitive elements adjacent at least one film (12A) having an image thereon in the form of transparent and opaque picture elements (pixels) (30 and 32) having predetermined dimensions, affecting relative movement between the array (26) and the film (12A) for sampling a plurality of pixels of the film by the array (26), assigning a predetermined number of photosensitive elements to a predetermined number of photosensitive elements to a predetermined width of pixels, effectively creating a first sample area (34) bounded by the predetermined width of pixels and a pre-established number of samples, effectively creating a second sample area (36) smaller than the first sample area (34) and bounded by a plurality of pixels, the center of the second sample area (36) being coincident with that of the first sample area (34), counting the photosensitive elements which provide signals indicating transparent pixel areas within the first sample area (34), counting the photosensitive elements which provide signals indicating transparent pixel areas within the second sample area (36), adding the count of the photosensitive elements of the second sample area (36) to the count of the photosensitive elements of the second sample area (36) minus the count of the first sample area (34) to provide a signal representing the percentage dot area (PDA) for use with an electromechanical gravure engraver (22).

19 Claims, 8 Drawing Figures

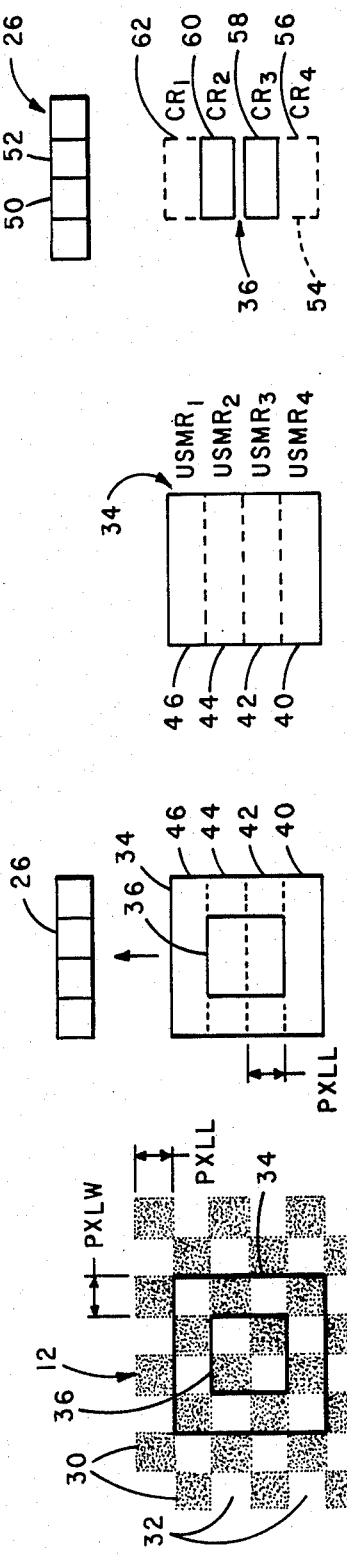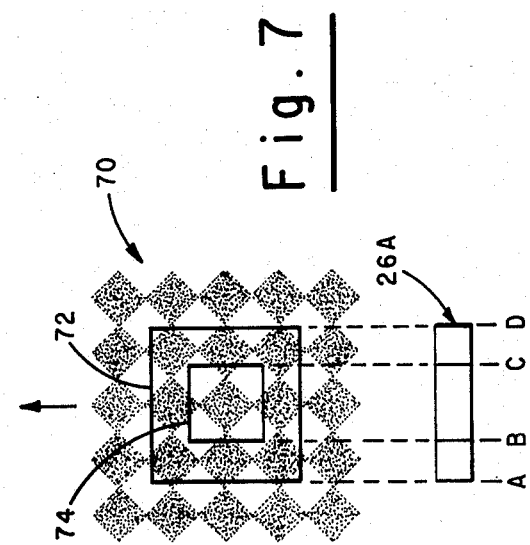

SCREEN GRAVURE ENGRAVING SYSTEM FOR ELECTROMECHANICAL ENGRAVERS

BACKGROUND OF THE INVENTION

The present invention relates to gravure printing, and more specifically to a screen gravure engraving system for electromechanical engravers.

Recently, with the advent of electronic and computer driven engravers, there has been renewed interest in converting halftone film, including offset halftones, for gravure cylinder application. This is due to the fact that there are major differences in the prepress procedures for offset and gravure printing. In the offset procedure the offset plate is made from four color separation films in the halftone. The color separations for making a gravure cylinder are continuous tone. While the halftone films have only opaque and transparent (black and white) areas, the continuous tone films have a multitude of shades of gray. The halftone films can be corrected by dot etching and can be readily copied by contact exposure. The continuous tone films cannot be corrected as easily and cannot be readily copied. Consequently, continuous tone separations are more costly. Using halftone films reduces the time and cost of prepress operations due to simpler techniques of film copying, film correction and color proofing.

When gravure cylinders are prepared (engraved) by etching techniques, special conversion screens are required. Converlog, Toppan and Neosan are three conversion-by-screen methods. These methods diffuse the light returning from the screen and film separation combination. Depending on the dot area the black and white light is evenly distributed so that the area will look darker or lighter. However, these conversion-by-screen methods are only applicable to the etching of gravure cylinders.

The introduction of the electromechanical engravers, such as the Helio-Klischograph or the Ohio Electronic Engraver Inc., engraver, requires optical scanning of the four color separations point by point or pixel by pixel (picture element by picture element) to form each gravure cell. The scanned digital value for each cell is translated into a penetration depth and the gravure cells are engraved into the gravure cylinder with the proper volume by the stylus of the engraver.

When continuous tone films are being used, the scanner is focused on a single pixel. When halftone or screened films are used, averaging or diffusion must take place. To obtain the same diffusion effect that was achieved with the aforementioned screen methods, defocusing of the scanner's optics is employed. By defocusing, the scanner is made to scan four pixels instead of one. The sensing element in the scanner (photomultiplier) averages the reading. The results produced are somewhat similar to those produced by the aforementioned screen conversion methods.

However, the defocusing method has a major shortcoming in that the edges or other details, where there is a major change in density, do not look sharp; the contrast is reduced and the edges look "soft." This softening at the edges makes the picture look less sharp, less focused. In an attempt to solve this problem, unsharp masking techniques were used including fixed inner and outer circular scanning apertures. The outer aperture reading is utilized to increase the slope between light and dark areas and, therefore, achieve a sharper edge. However, such systems are inflexible and cannot accommodate various screen angles, screen rulings and continuous tone films.

SUMMARY OF THE INVENTION

It is an object of the present invention to provide an improved screen gravure engraving system for electromechanical engravers.

It is a further object of the present invention to provide a screen gravure engraving system for electromechanical engravers which reduces the softening effect inherent in prior systems.

It is still a further object of the present invention to provide a screen gravure engraving system for electromechanical engravers which provides high quality gravure prints.

It is a still further object of the present invention to provide a gravure engraving system for electromechanical engravers which can accommodate halftone films and screen material of various screen angles and rulings as well as continuous tone films.

It is a still further object of the present invention to provide a gravure engraving system for electromechanical engravers in which the effective field of view can be changed on-the-fly to accommodate halftone films and screened material having various rulings and screen angles.

It is still a further object of the present invention to provide an improved screen gravure engraving system for electromechanical engravers in which density changes, including edge transitions, in the resulting gravure prints do not suffer the perceptible loss of accuracy or resolution observable with prior systems.

It is a still further object of the present invention to provide a screen gravure engraving system for electromechanical engravers which enables the use of economical and easily controlled screened and halftone material rather than continuous tone material.

Briefly, in accordance with the present invention, a method and associated apparatus is provided for converting halftone films and screened material for use with electromechanical gravure engravers, comprising the steps of positioning an array of photosensitive elements adjacent at least one halftone or screened film having an image theron in the form of opaque and transparent picture elements (pixels) having predetermined dimensions, effecting relative movement between the array and the film for sampling a plurality of pixels of the film by the array, assigning a predetermined number of photosensitive elements to a predetermined width of pixels, effectively creating a first sample area bounded by the predetermined width of pixels and a pre-established number of samples, effectively creating a second sample area smaller than the first sample area and bounded by a plurality of pixels, the center of the second sample area being coincident with that of the first sample area, counting the photosensitive elements which provide signals indicating transparent pixel areas within the first sample area, counting the photosensitive elements which provide signals indicating transparent pixel area within the second sample area, adding the count of the photosensitive elements of the second sample to the count of the photosensitive elements of the second sample area minus the count of the first sample area to provide a signal representing the percentage dot area (PDA) for use with an electromechanical gravure engraver.

Other objects, aspects and advantages of the invention will be apparent from the detailed description considered in conjunction with the preferred emobodiment of the invention illustrated in the drawings, as follows:

BRIEF DESCRIPTION OF THE DRAWINGS

FIG. 3 is a plan view of a portion of a halftone film illustrating the effective scanning areas utilized in accordance with the present invention;

FIG. 4 a plan view of the effective scanning areas of the CCD array with the halftone film removed;

FIG. 5 is a plan view of the CCD array and the total scanned area;

FIG. 6 is a plan view of the CCD array and the central scanned area;

FIG. 7 is a view of a portion of a halftone film at a screen angle of 45° and the CCD array illustrating the effective scanning areas used in accordance with the present invention.

DETAILED DESCRIPTION

Figures 1, 2:
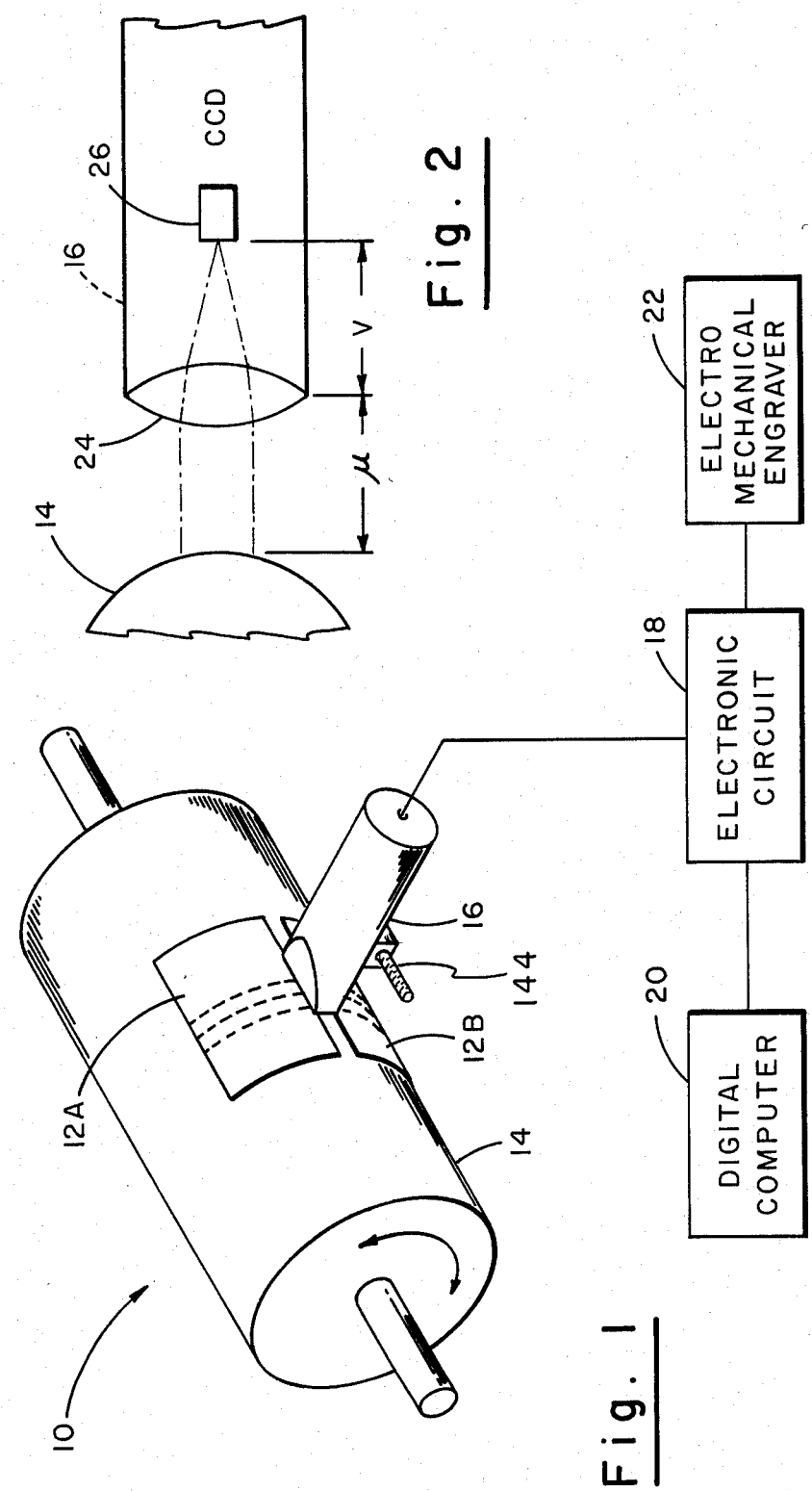
FIG. 1 is a perspective view illustrating a screen gravure engraving system for electromechanical engravers utilizing the present invention.
FIG. 2 is a schematic diagram illustrating the optics for use with the present invention.

Referring to FIG. 1, a screen gravure engraving system in accordance with the present invention is generally illustrated at 10. A plurality of films, preferably halftone or screened films, designated 12A and B, only two of which are shown, are mounted on a rotatable drum 14 which is rotated by conventional means (not shown).

A scanning head 16 is arranged proximate to the rotatable drum 14 for scanning the picture elements or pixels of the halftone films 12. The scanning head 16 includes a plurality of photosensitive elements arranged in a linear array, such as CCD Model 111 available from Fairchild CCD Imaging of Palo Alto, Calif. Such an array includes 256 elements or photodiodes. Generally, the photodiode array may include approximately 256 to approximately 1024 or more photodiodes. However, it should be understood that the scanning head 16 may include an area array or matrix of photosensitive elements such as CCD Model 222 available from Fairchild CCD Imaging, including an arrangement of 488×380 elements or photodiodes.

The scanning head 16 is used to replace the conventional single element photomultiplier scanner in conventional electromechanical engravers, such as the Helio-Klischograph, available from Dr. Ing. Rudolf Hell GMBH, the Ohio Electronic Engraver, Inc. engraver or other electromechanical engravers. The scanning head 16 is electrically coupled to an electronic circuit 18 which receives signals from the scanning head 16 and transmits them under control of a digital computer 20 to an electromechanical engraver 22 including an engraver driver (not shown) for actuating a diamond stylus (not shown) in a conventional manner to engrave gravure cells of the proper volume in a gravure cylinder. The scanning head 16 is preferably arranged so that the longitudinal axis of the linear array is parallel to the longitudinal axis of rotation of the drum 14.

Referring to FIG. 2, the scanning head 16 includes a lens 24 arranged therein to provide a magnified image of the scanned pixel area on the CCD array 26. Preferably, the scanning area of the CCD array 26 is set to correspond to the width of four (4) pixels, see FIGS. 3 and 4. For a screen ruling of 150 lines/inch, the area of each pixel is 170×170 microns; for a screen ruling of 170 lines/inch, the area of each pixel is 120×120 microns. It should be understood that the screen ruling as well as the angle of the halftone or screened films 12 may vary. Such variations are readily accommodated by the present invention.

Referring to FIG. 3, a halftone film 12 is illustrated having opaque portions 30 (black) and transparent portions 32 (white). Each black or white portion 30 or 32 represents one picture element or pixel, typically 170×170 W microns. The CCD array 26, here a linear array, which for example includes 256 photodiodes, extends over four (4) pixel widths and therefore has 64 photodiodes assigned to each pixel width (PXLW).

As the rotatable drum 14 of FIG. 1 rotates, the array 26 scans the halftone film 12 of FIG. 3 in the direction of the arrow. The number of samples per pixel length (PXLL) during the scanning is preset, e.g., eight (8) samples. Therefore, by presetting the number of samples per pixel to 8 and assigning 64 elements per pixel width the CCD array 26 can effectively scan each plxel. A large outer square area 34 having the dimensions of 4×4 pixels is used to obtain an unsharp masking signal. The CCD array 26 averages all the signals from the 16 pixels of the large area 34 to provide an average signal for determining the unsharp masking signal (USM). Within the large area 34 is a smaller or inner area 36 having its center coincident with the center of the large area 34 and the dimensions of 2×2 pixels. The average signal resulting from scanning the 4 pixels of the small area 34 is directly related to the percentage dot area (PDA).

Referring to FIG. 4, it is apparent that the CCD array 26 will scan the large area in four discrete sections 40, 42, 44 and 46, each of such sections having a width of 4 pixels and a length of 1 pixel (8 samples of the CCD array 26). As seen in FIG. 5, the four discrete sections 40, 42, 44 and 46 of the large area 34 are designated USMR$_4$, USMR$_3$, USMR$_2$ and USMR$_1$, respectively.

Additionally, as illustrated in FIG. 6, it is apparent that the centrally disposed photodiode groups 50 and 52 of the array 26 scan an intermediate area, shown in dotted outline as 54, which includes four discrete subsections 56, 58, 60 and 62, designated CR$_4$, CR$_3$, CR$_2$ and CR$_1$, respectively. The central two discrete subsections 58 and 60 or CR$_3$ and CR$_2$ define the small area 36.

Thus, it is apparent that for a photodiode array 26 of 256 photodiodes, each section 40, 42, 44 and 46 of FIG. 5 is an equal sub-area of the large area 34 and has a width of 256 photodiodes (4 PXLW) and a length of 8 samples (1 PXLL). It is likewise apparent that each segment 56, 58, 60 and 62 of FIG. 6 is an equal sub-area of the intermediate area 54 having a width of 128 photodiodes (2 PXLW) and a length of 8 samples (1 PXLL).

Referring to FIG. 7, a portion of a halftone film 70 is illustrated with a CCD array 26A arranged for scanning the same in the direction of the arrow. Advantageously, halftone films having different rulings or screen angles, such as halftone film 70, can be readily accommodated by the present invention by changing the number of photodiodes which cover the large area 72 and the small area 74 having its center coincident therewith. That is, the active length A-D of the photodiode array 26A may include only 180 photodiodes, e.g., photodiodes 39 through 218, and the small area 74 may have a width of 90 photodiodes, e.g., photodiodes 84 through 174 covering width B–C of the array 26A. This is readily accomplished by programming the computer 20 with the screen ruling and screen angle of the film 70. The photodiodes to be counted are then determined by the computer. Advantageously, the photodiodes to be counted can be changed on-the-fly to accommadate halftone and screened films of different rulings and screen angles by supplying such information to the computer. Further, continuous tone films may also be scanned with the offset to gravure conversion system of the present invention as will be described with reference to FIG. 8.

Figure 8:
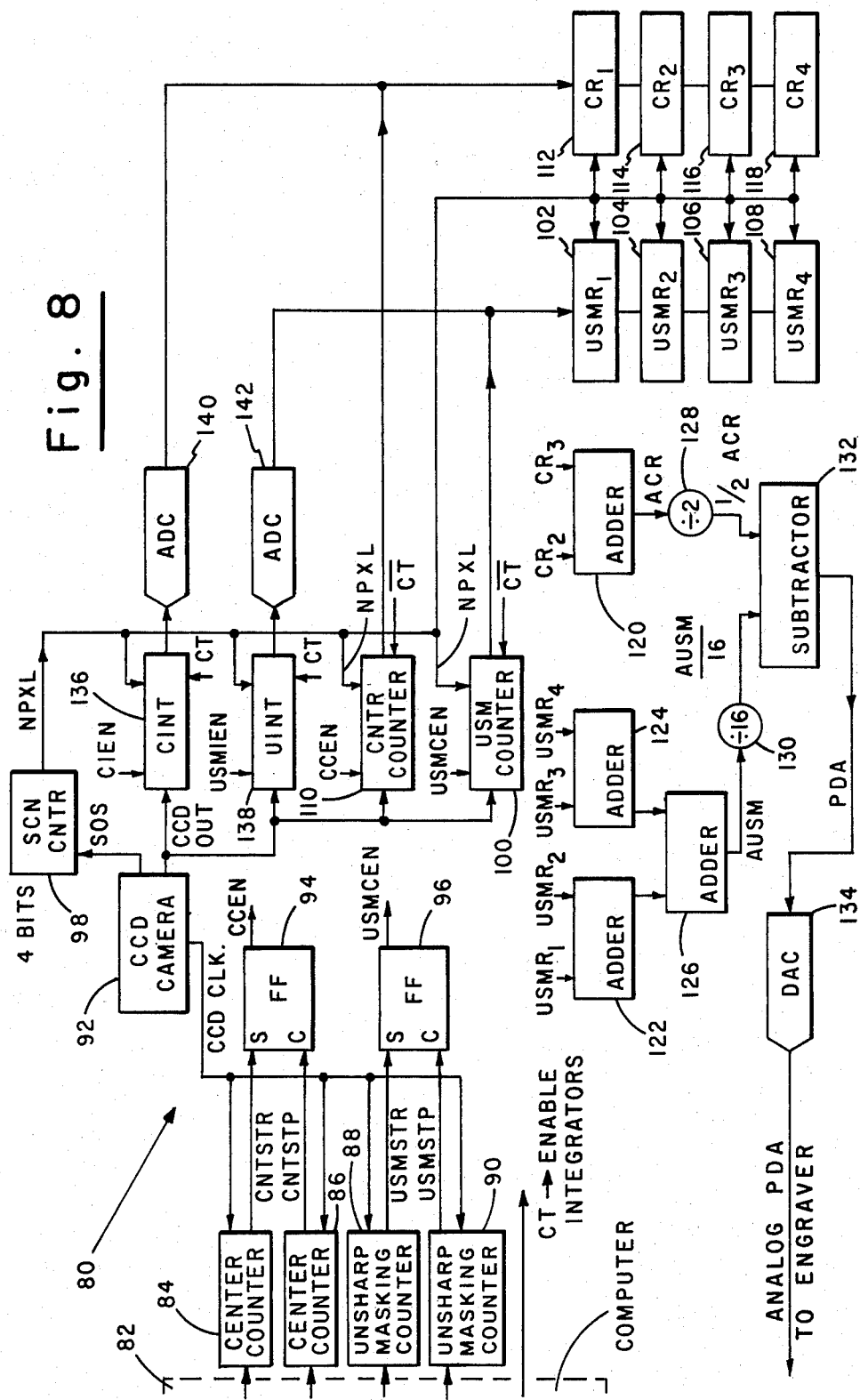
FIG. 8 is a block diagram of one form of electronic circuitry for implementing the screen gravure engraving system of the present invention.

Referring to FIG. 8, a block diagram of one form of implementation of the screen gravure engraving system of the present invention is illustrated generally at 80. A digital computer 82 is programmed to preset center counters 84 and 86, and unsharp masking counters 88 and 90 in accordance with input information regarding the screen ruling (pixel size) and angle of the halftone or screened film or films to be scanned. The four counters 84–90 are counted down by CCD clock signals (CCD CLK) from a CCD camera 92. When the preset counters 84–90 are counted down to zero by the CCD CLK signal, a signal is produced to set or clear flip-flops 94 and 96. Counter 84 is used to set the terminal of flip-flop 94 which sets its output to provide a center counter enable signal (CCEN). The counter 86 provides a center counter stop signal (CNTSTP) to the clear terminal of flip-flop 94 to clear the CCEN signal from its output. The counter 88 provides an unsharp masking counter start signal (USMSTR) to the set terminal of a flip-flop 96 which sets the flip-flop 96 to provide an unsharp masking counter enable signal (USMCEN) at its output. The counter 90 provides an unsharp masking counter stop signal (USMSTP) to the clear terminal of flip-flop 96 which clears the USMCEN signal from its output.

As the CCD camera 92, which includes the CCD array and the pertinent optics, scans the film (halftone, screened or continous tone) a train of pulses is supplied from the photodiodes as the CCD OUT signal. The CCD CLK signal provides pulses to shift the CCD OUT signal as the array is being sampled. The CCD array transmits a start of scan (SOS) signal to a scan counter 98 at the beginning of the scan. The scan counter 98 is preset to provide a predetermined number of CCD samples. Preferably, each pixel is sampled 8 times, although this may vary, e.g., 6 times, as desired. The scan counter 98 is advanced (decremented) by the SOS signal from the CCD camera 92 and counts down with each scan until one PXLL is completely scanned. Thereafter, a new pixel signal (NPXL) is outputted from the scan counter 98 and the counting of a new pixel length (NPXLL) commences. That is, the scan counter 98 establishes the length of each pixel.

The USM counter 100 is enabled by the USMCEN signal from flip-flop 96. In the presence of the USMCEN signal, the USM counter 100 will count the amount of light accumulated by the diodes in the preset array length during each scan (CCD OUT signal). The USM counter 100 ceases counting when the signal USMCEN is absent from the USM counter 100. At the end of eight (8) samples, sub-area 40 in FIG. 5 is completely scanned. The USM count for the sub-area 40 in FIG. 5 is then transferred to USM register (USMR$_1$) 102 in response to a NPXL signal. The USM counter 100 will then count sub-area 42. The count for sub-area 40 is then transferred to USM register (USMR$_2$) 104 and the count for sub-area 42 in FIG. 5 is transferred to USM register 102 in response to another NPXL signal. The count for sub-area 40 is then transferred from USM register 104 to USM register (USMR$_3$) 106 and the count for sub-area 42 in FIG. 5 is transferred to USM register 104 and the count for sub-area 44 is transferred to USM register 102 in response to another NPXL signal. Finally, the count for sub-area 40 is transferred from USM register 106 to USM register (USMR$_4$) 108, the count for sub-area 42 is transferred from USM register 104 to USM register 106, the count for sub-area 44 is transferred from USM register 102 to USM register 104, and the count for sub-area 46 is transferred from the USM counter 100 to USM register 102 in response to another NPXL signal. Thus, the counts for the discrete sub-areas 40–46, as seen in FIGS. 4 and 5, are stored in USM registers 108, 106, 104, and 102, respectively. This count represents the total count for the large area 34 as seen in FIGS. 3, 4, and 5, as a square 4×4 pixels.

The center counter 110 is enabled by the CCEN signal from the flip-flop 94. In the presence of the CCEN signal, CNTR counter 110 will count the amount of light accumulated by those diodes in the preset array sub-group which extend over array portions 50 and 52 as shown in FIG. 6, thereby establishing the width of the intermediate area 54. In the same manner as the counts for sub-areas 40–46 are accumulated in USM registers 108 to 102, respectively, the counts for sub-areas 56–62 are accumulated in center registers (CR$_4$–CR$_1$) 118–112, respectively. Thus, the counts for the discrete subareas 56–62, as seen in FIG. 6, are stored in CR registers 118 through 112, respectively. This count represents the total count for the area defined by the width of the central two pixels of the scan in FIG. 6, shown as 2×4 pixels.

Advantageously, the storage of the counts for the intermediate area 54 in discrete sub-area 56–62 enables the ready determination of the small area 36 shown also in FIGS. 3 and 4 which measures 2×2 pixels. This is accomplished by adding the counts for sub-areas 58 and 60 or registers 116 and 114 (CR$_3$ and CR$_2$) via adder 120.

The total count for the large area 34 is obtained by adding the counts for the sub-areas 40–46 or registers 102–108 (USMR$_1$–USMR$_4$) via adders 122, 124 and 126.

Thus, in accordance with the present invention in effect two synthetic apertures are provided, which are changeable on-the-fly; one synthetic aperture corresponding to the large area 34 and the other synthetic aperture corresponding to the small area 36. The center aperture sum (ACR) is obtained from area 36 of 4 pixels (2×2). The unsharp masking aperture sum (AUSM) is obtained from area 34 of 16 pixels (4×4).

From unsharp masking techniques, it is known that detail enhancement for each pixel can be obtained by adding to the signal from a central area a signal representing the difference between the signal from the central area 36 and the signal from the large area or synthetic aperture 34. Since, the signal from the central area 36 covers 4 pixels and the signal from the large area 34 covers 16 pixels, the required signal for detail enhancement is $$DE_s = \frac{C_s}{4} + \left(\frac{C_s}{4} - \frac{USM_s}{16}\right)$$

$DE_s$=detail enhancement signal
$C_s$=center area signal
$USM_s$=large area or unsharp masking signal Thus, the PDA per pixel or detail enhancement signal is:

$$PDA = \frac{ACR}{4} + \left(\frac{ACR}{4} - \frac{AUSM}{16}\right)$$

$$PDA = \frac{ACR}{2} - \frac{AUSM}{16}$$

$$ACR = CR_2 + CR_3$$

$$AUSM = USMR_1 + USMR_2 + USMR_3 + USMR_4$$

Referring again to FIG. 8, since the resulting data is in binary form, to obtain the component ACR/2 the output from the adder 120 is shifted one position toward the least significant bit by a one position shift register 128. To obtain the component AUSM/16, the output from the adder 126 is shifted 4 positions toward the least significant bit by a four position shift register 130. Finally, to provide the PDA signal the signals ACR/2 and AUSM 16 are applied to a subtractor 132, which is an adder using two's—complement logic for subtraction. The digital signal representing the PDA is applied to a digital to analog converter 134 and the resulting analog signal is transferred to the electromechanical engraver 22, see FIG. 1.

Since the CCD OUT signal is a function of the amount of light accumulated by a specific photodiode in the array, this signal is analog in nature. Therefore, advantageously, the CCD camera 92 can also be utilized to scan continuous tone film by deactivating the CNTR counter 110 and USM counter 100 and activating center integrator (CINT) 136 and unsharp masking integrator (UINT) 138. The analog integrators 136 and 138 will analogically accumulate the output signals from the CCD camera 92 in response to a continous tone (CT) signal from the computer 82. When the CT signal from the computer 82 is true, the CNTR counter 110 and USM counter 100 are disabled and the center integrator 136 and unsharp masking integrator 138 are enabled by CIEN and USMIEN enable signals provided by a similar arrangement of counters and flip-flops as described with reference to the generation of the signals CCEN and USMCEN for halftone scanning. The analog signals from center integrator 136 and unsharp masking integrator 138 are converted to digital signals by two analog to digital converters (ADCs) 140 and 142 and the digital signals stored in registers CR and USMR, respectively. Control of the synthetic apertures, i.e., the photodiodes to be counted, or switching between the counters 100 and 110 and the integrators 136 and 138 is accomplished instantaneously by the computer 82.

Referring again to FIGS. 1 and 3, vertical scanning of different groupings of pixels comprising the large area 34 and small area 36 is accomplished as the drum 14 rotates. In this manner, an entire ribbon or circumference of the film 4 pixels wide is scanned. The ribbon is effectively scanned in area increments which includes adding 4 new pixels to 12 old pixels of the large area 34 and adding 2 new pixels to two old pixels of the small area 36 of the immediately previously scanned area 36. Thus, the areas 34 overlap each other with three common sections 4 pixels wide and one pixel in length. Different horizontal groupings of pixels comprising the large area 34 and small area 36 are obtained by shifting the scanninghead 16 one pixel width horizontally to scan another ribbon circumference having a width of four pixels. This is accomplished, for example, by changing the setting of a lead screw 144, see FIG. 1. With each horizontal shift in the scanning head 16, 4 new pixels are added to 12 old pixels of the large area and 2 new pixels to two old pixels of the small area 36 for the ribbon circumference of an adjacent scanned area. Thus, as a result of the vertical and horizontal scanning described, each individual pixel is overlapped and isolated so that each pixel of the halftone, screened or continuous tone film is scanned.

It should be apparent to those skilled in the art that the present invention provides a screen gravure engraving system for electromechanical engravers capable of utilizing halftone and screened films having different screen angles and rulings, as well as allowing use of continuous tone films on one ribbon (one circumference), thereby providing maximum efficiency and flexibility during scanning. Moreover, it should be apparent to those skilled in the art that various modifications may be made in the present invention without departing from the spirit and scope thereof, as described in the specification and defined in the appended claims.

What is claimed is:

1. A method for converting halftone and screened film for use with electromechanical gravure engravers, comprising the steps of:

positioning an array of photosensitive elements adjacent at least one film having an image thereon in the form of transparent and opaque picture elements (pixels) having predetermined dimensions;

affecting relative movement between the array and the film for sampling a plurality of pixels of the film by the array;

assigning a predetermined number of photosensitive elements to a predetermined width of pixels;

effectively creating a first sample area bounded by the predetermined width of pixels and a pre-established number of samples;

effectively creating a second sample area smaller than the first sample area and bounded by a plurality of pixels, the center of the second sample area being coincident with that of the first sample area;

counting the photosensitive elements which provide signals indicating transparent pixel areas within the first sample area;

counting the photosensitive elements which provide signals indicating transparent pixel areas within the second sample area; and adding the count of the photosensitive elements of the second sample area to the count of the photosensitive elements of the second sample area minus the count of the first sample area to provide a signal representing the percentage dot area (PDA) for use with an electromechanical gravure engraver.

2. The method recited in claim 1, including the step of:

converting the PDA signal to an analog signal adaptable for use by an electromechanical engraver to engrave a gravure cell of the desired volume in a gravure cylinder.

3. The method recited in claim 1, including the steps of:
  mounting a plurality of films on a rotatable drum;
  indicating the angle and ruling for each film;
  varying the count to sample new areas of the film in accordance with the change in the angle and ruling for each film.

4. The method recited in claim 1, including the step of:
  optically generating a magnified image of the pixels to be scanned on the photosensitive elements of the array.

5. The method recited in claim 3, including the step of:
  moving the array one pixel width after completion of the scanning of a circumference of pixel areas to sample an adjacent circumference.

6. The method recited in claim 1, including the steps of:
  including at least one continuous tone film;
  integrating the output of the photosensitive elements over the first sample area;
  integrating the output of the photosensitive elements over the second sample area;
  converting the integrated outputs to digital signals;
  storing the converted digital signals to provide a signal representing an enhanced percentage dot area (PDA).

7. A method for converting halftone and screened film for use with electromechanical gravure engravers, comprising the steps of:
  providing an array of photosensitive elements;
  arranging at least one film with image information thereon in the form of transparent and opaque picture elements (pixels) having predetermined dimensions relative to the array;
  assigning a predetermined number of photosensitive elements of the array to each pixel width of the film;
  sampling a predetermined length of the film corresponding to a predetermined number of pixel lengths;
  repeating the sampling of the predetermined length of the film a predetermined number of times to cover a predetermined outer area covering a plurality of pixels;
  counting the number of photosensitive elements which detect transparent portions within the predetermined outer area;
  counting the number of photosensitive elements which detect transparent portions bounded by an inner predetermined area including a plurality of pixels and having its center coincident with the center of the predetermined outer area; and
  providing a signal representing an enhanced percentage dot area (PDA) per pixel by adding the count of the inner predetermined area to the count of the inner predetermined area minus the count of the outer predetermined area, such PDA signal being adaptable for use by an electromechanical engraver to engrave gravure cells of the desired volume in a gravure cylinder.

8. The method recited in claim 7, including the steps of:
  setting a group of photosensitive elements of the array to be counted to establish the width of the outer area;
  pre-establishing a predetermined number of samples per pixel length and defining the length of the outer and inner area to include a multiplicity of pixel lengths;
  storing the count for each sub-area of the outer area, each sub-area being bounded by the width of the group of photosensitive elements and one pixel length, which corresponds to a predetermined subgroup of the total samples for the outer area;
  storing the count for each sub-area of the inner area bounded by the width of the inner area and one pixel length, which corresponds to a predetermined sub-group of the total samples for the outer area;
  providing a signal representing the enhanced percentage dot area (PDA) by adding a fraction of the count for the central two sub-areas of the inner area, the fraction corresponding to one-half the number of pixels in the central two sub-areas, and subtracting therefrom a fraction of the count for the outer area, the fraction corresponding to the number of pixels in the large area.

9. The method recited in claim 7, including the step of:
  varying the effective size of the outer and inner areas by changing the count of the photosensitive elements to accommodate films having varying screen angles and rulings.

10. The method recited in claim 9, including the step of:
  changing the count of the photosensitive elements on-the-fly to accommodate films having varying screen angles and rulings.

11. System for converting halftone and screened film for use with electromechanical gravure engravers, comprising:
  an array of photosensitive elements for scanning the film;
  rotatable means positioned adjacent the array and having mounted thereon at least one film having an image thereon in the form of transparent and opaque picture elements (pixels) having predetermined dimensions;
  first gating means for counting a first predetermined number of photosensitive elements during each scan, the first predetermined number of photosensitive elements corresponding to the width of a plurality of pixels;
  second gating means for counting a second predetermined number of photosensitive elements during each scan, the second predetermined number of photosensitive elements corresponding to the width of a plurality of pixels having a total width less than the first predetermined number of photosensitive elements;
  counter means for determining the number of samples per pixel length and thereby establishing in conjunction with said first and second counting means first and second predetermined sampled areas; and
  means for providing a signal representing an enhanced percentage dot area (PDA) including a portion of the count of the second predetermined sampled area minus a portion count of the first predetermined sample area as determined by the number of pixels covered by the second and first predetermined sample areas.

12. The system recited in claim 11, including:

means for converting the PDA signal to an analog signal adaptable for use by an electromechanical engraver to engrave a gravure cell of the desired volume in a gravure cylinder.

13. The system recited in claim 11 wherein a plurality of films are mounted on said rotatable means including:
means for resetting said gating means to effectively vary the areas of the film to be sampled in accordance with a change in the angle and ruling of each film.

14. The system recited in claim 11, including:
means for optically generating a magnified image of the pixels to be scanned on the photosensitive elements of the array.

15. The system recited in claim 11, including:
means for moving the array horizontally one pixel width after completion of the scanning of a circumference of pixel widths to sample another circumference of pixel widths.

16. The system recited in claim 11, wherein:
said rotatable means includes at least one continuous tone film;
means for integrating the output of the photosensitive elements over the first sample area;
means for integrating the output of the photosensitive elements over the second sample area;
means for converting the integrated outputs to digital signals;
means for storing the converted digital signals.

17. The system recited in claim 11, wherein:
said first gating means enables the counting of a group of photosensitive elements of the array which establishes the predetermined width of the first sample area;
said second gating means enables the counting of a sub-group of photosensitive elements of the array which establishes the predetermined width of the second sample area;
means for storing the count for the first sample area which is bounded by the width of the group of photosensitive elements and a plurality of pixel lengths which corresponds to a predetermined number of samples by the array;
means for storing the count for a portion of the second sample area which is bounded by the width of the sub-group of photosensitive elements and a plurality of pixel lengths which corresponds to a predetermined number of samples by the array; and
means for providing a signal representing an enhanced percentage dot area (PDA) including a portion of the count of the second area minus a portion of the count of the first area as determined by the total number of pixels covered by the first and second sample areas.

18. The system recited in claim 11, wherein:
said array of photosensitive elements is a linear array.

19. The system recited in claim 11, wherein:
said array of photosensitive elements is a matrix array.

* * * * *

UNITED STATES PATENT AND TRADEMARK OFFICE
CERTIFICATE OF CORRECTION

PATENT NO. : 4,612,584

DATED : September 16, 1986

INVENTOR(S) : Harvey F. George et al.

It is certified that error appears in the above-identified patent and that said Letters Patent is hereby corrected as shown below:

On The Title Page insert

--[22] PCT Filed: June 3, 1983

[86] PCT No: US83/00860

371 Date: Oct. 31, 1984

102(e) Date: Oct. 31, 1984

[87] PCT Pub. No.: WO84/05006

PCT Pub. Date: Dec. 20, 1984      --.

Signed and Sealed this

First Day of January, 1991

Attest:

HARRY F. MANBECK, JR.

*Attesting Officer*  *Commissioner of Patents and Trademarks*